US008065067B2

(12) United States Patent
Svendenius et al.

(10) Patent No.: US 8,065,067 B2
(45) Date of Patent: Nov. 22, 2011

(54) SYSTEMS AND METHODS FOR DETERMINING A PARAMETER RELATING A TIRE-TO-ROAD CONTACT AND/OR A RELATION BETWEEN A WHEEL AND A VEHICLE MOTION

(75) Inventors: Jacob Svendenius, Lund (SE); Magnus Gaefvert, Lund (SE); Fredrik Bruzelius, Goeteborg (SE); Johan Hulten, Goeteborg (SE)

(73) Assignees: Haldex Brake Products AB (SE); Volvo Car Corporation (SE)

( * ) Notice: Subject to any disclaimer, the term of this patent is extended or adjusted under 35 U.S.C. 154(b) by 495 days.

(21) Appl. No.: 12/041,404

(22) Filed: Mar. 3, 2008

(65) Prior Publication Data

US 2008/0243348 A1 Oct. 2, 2008

(30) Foreign Application Priority Data

Mar. 1, 2007 (EP) ..................................... 07004274

(51) Int. Cl.
G06F 7/00 (2006.01)
G06F 17/00 (2006.01)
G05D 1/00 (2006.01)
B60T 7/12 (2006.01)
(52) U.S. Cl. .................................. 701/80; 701/90; 73/9
(58) Field of Classification Search .................... 701/80, 701/90; 73/9
See application file for complete search history.

(56) References Cited

U.S. PATENT DOCUMENTS 6,549,842 B1 4/2003 Hac et al.
6,556,911 B2 * 4/2003 Matsuno .......................... 701/80
7,184,868 B2 * 2/2007 Matsunaga et al. ............. 701/38
2003/0074116 A1 * 4/2003 Winner et al. ................... 701/29
2004/0032165 A1 2/2004 Levy et al.

FOREIGN PATENT DOCUMENTS

DE 3446016 A1 6/1986
DE 10205971 A1 11/2002
EP 1719676 A1 11/2006

OTHER PUBLICATIONS

Müller Steffen et al. "Estimation of the Maximum Tire-Road Friction Coefficient", Journal if Dynamic Systems, Measurement, and Control, Dec. 2003, 11 Pages.
Extended European Search Report, EP 07004274, Aug. 8, 2007, 7 Pages.
Ray L. R.: "Nonlinear State and Tire Force Estimation for Advanced Vehicle Control" IEEE Transactions on Control Systems Technology, IEEE Service Center, New York, NY, US, vol. 3, No. 1, Mar. 1, 1995, pp. 117-124.
Svendenius Jacob, "Tire Models for Use in Braking Applications", Department of Automatic Control Lund Institute of Technology, Nov. 2003, 95 Pages.

* cited by examiner

*Primary Examiner* — Jack Keith
*Assistant Examiner* — Rami Khatib
(74) *Attorney, Agent, or Firm* — St. Onge Steward Johnston & Reens LLC (57) ABSTRACT

The present invention refers to systems and to methods for determining at least one parameter relating to a tire-to-road contact and/or a relation between a wheel and a vehicle motion. In particular, the present invention refers to systems and to methods for determining the coefficient of friction between a tire and a road surface. For that purpose, the systems and methods according to the invention use new estimation filtering procedures.

11 Claims, 7 Drawing Sheets

SYSTEMS AND METHODS FOR DETERMINING A PARAMETER RELATING A TIRE-TO-ROAD CONTACT AND/OR A RELATION BETWEEN A WHEEL AND A VEHICLE MOTION

CROSS-REFERENCE TO RELATED APPLICATIONS

The present application claims priority of European patent application No. 07004274.2 filed on Mar. 1, 2007, the content of which is incorporated herein by reference.

FIELD OF THE INVENTION

The present invention refers to systems and to methods for determining at least one parameter relating to a tire-to-road contact and/or a relation between a wheel and a vehicle motion. In particular, the present invention refers to systems and to methods for determining the coefficient of friction between a tire and a road surface.

BACKGROUND OF THE INVENTION

The coefficient of friction is often a crucial parameter for the control of driver assistance systems, such as e.g. anti-skid systems (ABS), traction control systems (ASR) or electronic stability programs (ESP) in all kind of vehicles. For such systems which are integrated in the vehicle, it is valuable to know at which actual values of the slip of the individual tire the friction is best utilized under all different driving conditions, i.e. during constant driving, accelerating and braking both at longitudinal and turning movements of the vehicle. The actual value of friction can be also communicated to the driver in order to provide him with information which driving style will be adequate.

It is well known that the tires of a vehicle are exposed to slip, which occurs due to the difference between the vehicle speed and the rotational speed of the single wheels, when forces between the tires and the road surface have to be transferred during driving. In addition to this longitudinal slip, lateral slip occurs when the tire is moving perpendicular to the rotational direction.

In this context, much effort still is spent on developing algorithms for the estimation of different parameters relating to a tire-to-road contact and/or a relation between a wheel and a vehicle motion, in particular for the estimation of the coefficient of friction, a parameter which cannot be measured or sensed directly during driving.

In recent developments, in general, when dealing with the dynamics in vehicles and the control of the forces to be developed by the tire, recursive estimation algorithms are used which mainly are based on the common assumption that the tire forces can be expressed by a nonlinear function which is dependent on the slip and in addition on a set of parameters which describe the actual conditions of the tire and the road surface.

Such approaches take into account that the tire force which is developed at a particular slip substantially depends on other factors, such as tire pressure, tire temperature, tire load etc., whereby different models have been developed in order to describe the parameter-dependent behaviour and relations. Other signals to be used in such algorithms include the wheel speed, the vehicle speed, the engine torque, longitudinal and lateral accelerations of the vehicle, vehicle yaw rate etc.

In general, parameters related to the vehicle motion may include all kind of motions, forces and torques acting on and in the vehicle as well as on the individual wheels.

For example, concerning the determination of the coefficient of friction, European patent EP 0 630 786 B1 suggests a method, in which the wheel speed, the rotational acceleration of the vehicle wheel and the braking pressure are determined, the wheel slip is calculated therefrom and from these values the coefficient of friction is determined by means of linear recursive estimation algorithms.

One well-known approach is based on the estimation of the tire stiffness, which can be described by the inclination of the tire force relative to the tire slip at low slips. From the value of the inclination it is distinguished between different conditions of the road surface by using a linear tire model which assumes that the actual tire stiffness and the actual road condition are interrelated.

However, the tire stiffness depends on many factors and a generic relation between the inclination and the exact coefficient of friction or other parameters relating to a tire-to-road contact and/or a relation between a wheel and a vehicle motion is therefore not possible to obtain. Even the surface detection is not always reliable due to the large variation of the tire stiffness invoked by other reasons. Thus, the use of the tire stiffness as an indicator for friction, other tire-dependent or other vehicle motion-dependent parameters is limited to certain, few real conditions. This is particular due to the fact that the parameters used for the algorithms in question can change quickly so that also the importance of each particular parameter changes as the value of, e.g. the slip changes. In some scenarios, the curvature of the relation between the tire force and the tire slip might be misinterpreted as a changed value of the tire stiffness for higher tire forces.

SUMMARY OF THE INVENTION

Based on the above mentioned considerations, it is an object of the invention to provide systems and methods to be implemented in such systems for the determination of at least one parameter relating to a tire-to-road contact and/or a relation between a wheel and a vehicle motion which is more accurate than previously employed systems and methods of the prior art. Furthermore, it is an object of the invention to provide such systems and methods which are more reliable and more stable, in particular for determining the coefficient of friction.

These objects are achieved by methods for determining at least one parameter relating to a tire-to-road contact and/or a relation between a wheel and a vehicle motion for ease of understanding in the following referred to as the so-called "data bin-method.

In general, the aim of the invention is to determine properties and characteristics of either the tire-to-road contact and/or of the motion behaviour of the vehicle for further processing in, e.g. vehicle assistance systems, from measurements of certain signals and thereby using a given physical model of the tire-to-road contact and/or the vehicle motion.

In the prior art this was achieved by certain filtering estimation procedures. Traditional estimation is commonly based on the process of dynamic filtering in the time domain, which requires a sufficient excitation of the corresponding signals, which signals therefore must vary sufficiently during the time window as spanned by the defined filter dynamics.

The invention suggests new filtering dynamics to be used in such methods and systems, which further enhance the estimation procedures.

In a first embodiment of a method (the "data bin-method") for determining at least one parameter relating to a tire-to-road contact and/or a relation between a wheel and a vehicle motion, the method comprises the steps of:

sensing a plurality of parameters related to the vehicle motion, determining said at least one parameter from a relationship defined by at least two parameters relating to the tire and/or vehicle motion using estimation filtering procedures;

whereby the estimation filtering procedures comprise the steps of defining a set of data bins corresponding to intervals which are defined for values of said at least two parameters relating to the tire and/or vehicle motion, respectively, continuously determining an actual value of an at least first parameter and selecting the data bins corresponding to said actual value of the at least first parameter and updating and storing values of the at least first parameter and of an at least second parameter in said selected data bins, respectively, and/or continuously determining an actual value of an at least second parameter and selecting the data bins corresponding to said actual value of the at least second parameter and updating and storing values of the at least second parameter and of an at least first parameter in said selected data bins, respectively.

This method is implemented by a system (the "data bin-system") for determining at least one parameter relating to a tire-to-road contact and/or a relation between a wheel and a vehicle motion, the system comprising a plurality of sensors for sensing a plurality of parameters related to the vehicle motion, a control unit with at least one memory, in which memory a relationship defined by at least two parameters relating to the tire and/or vehicle motion is stored, at least one filter operative to determine said at least one parameter, whereby the filter comprises means operative to define a set of data bins corresponding to intervals which are defined for values of said at least two parameters relating to the tire and/or vehicle motion, respectively, means operative to continuously determine an actual value of an at least first parameter and to select the data bins corresponding to said actual value of the at least first parameter, whereby said means are further operative to update and to store values of the at least first parameter and of an at least second parameter in said selected data bins, respectively, and/or means operative to continuously determine an actual value of an at least second parameter and to select the data bins corresponding to said actual value of the at least second parameter, whereby said means are further operative to update and to store values of the at least second parameter and an at least first parameter in said selected data bins, respectively.

In particular, the method as implemented in the above system comprising a control unit is realized in that the control unit receives first signals from sensors representing a plurality of parameters related to the vehicle motion, receives second signals from a memory representing a relationship defined by at least two parameters relating to the tire and/or the vehicle motion, transmits third signals to at least one filter representing the definition of a set of data bins corresponding to intervals which are defined for values of said at least two parameters relating to the tire and/or the vehicle motion, transmits fourth signals to the at least one filter representing the determination of an actual value of an at least first parameter and/or of an at least second parameter, receives fifth signals from said at least one filter representing updated and stored values of the at least first parameter and of the at least second parameter in data bins, respectively, which data bins have been selected by the at least one filter on basis of the fourth signals.

The signal can be single signals or a set of signals representing the different parameters within the system.

The at least first parameter and the at least second parameter of the at least two parameters relating to the tire and/or the vehicle motion can be any parameters which are used and included in physical models to explain the behaviour of a tire in the tire-to-road contact and/or the vehicle motion, such as e.g. the tire stiffness, the tire slip, the tire force, etc. In general, these parameters may be selected from all kind of motions, forces and torques which are acting on and in a vehicle during its movement. In other words, the physical models generally are representing the relationship which is defined by the at least two parameters relating to the tire and/or vehicle motion.

According to the invention, in the filtering procedures, the signal space defined by the at least two parameters is discretized into these so-called data bins, whereby the subsequent estimation is based on a set of these at least two parameters.

In analogy with the sufficient excitation of dynamic filtering, at least three pairs containing these two parameters are required with sufficient spatial separation between them. In order to obtain such sufficient separation, the domains of the signals relating to the at least two parameters are divided into intervals. The signal information from each interval will be collected and then stored into the persistent data bins. This is performed for each defined time instance.

The signal information contained in the data bins corresponds to a compact representation of a set of samples, e.g. in the form of average values, as will be explained below. Then, the collection of pairs of the values from all data bins constitutes a set of data pairs, which are sufficiently separated and used for the subsequent parameter estimation.

The intervals themselves will be defined by the set structure of the filter used depending on the desired signal quality.

In other words, the "data bin-method" is either using the first parameter or the second parameter or, at the same time, both parameters to update the corresponding values in the data bins.

However, according to the invention, it is also possible that the data bins used in the filtering estimation procedures as described above will contain more than two parameters relating to the tire and/or the vehicle motion. Further signal dimensions can be introduced leading to different types of data bins.

Considering a pair of parameters, from the magnitude of the first parameter the method determines to which data bin the pair containing said first parameter and the second parameter corresponding to said first parameter belongs to. In this selected data bin the values for both the first parameter and the second parameter are updated. In analogy, from the magnitude of the second parameter the method determines to which data bin the pair containing said second parameter and the first parameter corresponding to said second parameter belongs to. Accordingly, in this selected data bin the values for both the second parameter and the first parameter are updated.

Thus, each sampling affects two separate data bins, one data bin which is derived from the signal of the first parameter and another data bin which is derived from the signal of the second parameter.

For each data bin, for updating the values contained therein a weighing routine is performed to further enhance the reliability of the parameter estimation.

Therefore, the steps of updating the values of the two parameters in the data bins may include
  averaging over the previously stored value of the first parameter or the previously stored value of the second parameter and the determined actual value of the first parameter or the determined actual value of the second parameter, respectively.

Furthermore, the method further may comprise the steps of assessing the importance of the values of the two parameters within each of the selected data bins, respectively, and/or
  assessing the confidence of the values of the parameters within each of their data bins, respectively.

Correspondingly, the system comprises means operative to average over the corresponding parameters and to assess the importance and/or the confidence of their values, respectively.

In order to ensure that the inventive concept is accurate also in the time domain so that the results in fact do reflect the actual conditions, the storage algorithm has to be equipped with a change detection feature that quickly erases the stored values in the data bins to adapt to any new condition.

This is achieved in that the method further comprises the steps of
  detecting a defined change in at least one of the parameters, and
  clearing and resetting the data bins,
by using corresponding means of the system which are operative to perform such steps.

Preferably the defined change will be detected in at least one of the data bins.

Thereby, by said time filtering in the storage data bins slow and small changes can be detected and captured, whereby a freshness ranking of the data can be performed in addition.

In a preferred embodiment of the invention, the first parameter is selected to be the tire force, preferably normalized tire force, and the second parameter is selected to be the tire slip.

Depending on the physical model which corresponds to the relationship which is defined by at least two parameters relating to the tire and/or vehicle motion, the such acquired contents of the data bins are then matched to said relationship, e.g. the behaviour of the physical model, by using optimization algorithms and then the at least one parameter to be determined is estimated from said relationship.

Accordingly, the method further comprises the step of continuously adapting the relationship to said updated values of the parameters in the data bins.

For instance, by using predefined data bins, the curvature of the relation between the tire force and the tire slip can be determined in the tire/slip-data plane, and not, as in the methods and systems of the prior art, the slope or inclination of this relation which corresponds to the tire stiffness as an indicator of the friction in that the friction is derived from the deviation from linearity in the force-slip slope, as previously used in tire models.

Using the curvature instead of the tire force-slip slope is of particular advantage, since the algorithms used for these methods and systems are based on a clear, verified relation between the measurements of the parameters and the friction. The method of estimation becomes therefore more stable and more reliable.

Alternatively, the physical model used for the tire behaviour can be also adapted to describe a relation between a self-aligning torque, which can be measured from the steering behaviour, as the first parameter and a lateral tire force as the second parameter.

For the purpose of adaptation, suitable optimization algorithms may include the methods of Recursive Least-Squares, Gauss-Newton or the so-called "grid-method", which according to the invention can be also used as an alternative to the afore-explained data bin-method for directly spatially dividing the parameter space, as will be described in more detail in the following.

Thus, according to another embodiment of the method (the "grid-method") for determining at least one parameter relating to a tire-to-road contact and/or a relation between a wheel and a vehicle motion, the method comprising the steps of:
  sensing a plurality of parameters related to the vehicle motion,
  determining said at least one parameter from a relationship defined by at least two parameters relating to the tire and/or vehicle motion using estimation filtering procedures;
whereby the estimation filtering procedures comprise the steps of
  define a finite set of values for at least two of said parameters, respectively,
  identifying values for the at least two parameters, respectively, which correspond to said finite sets based on said relationship,
  determining the actual value of an at least first parameter and/or the actual value of an at least second parameter, and
  selecting the at least one parameter which corresponds to the values for the at least first parameter and/or for the at least second parameter based on said relationship which are closest to the determined actual value of the at least first parameter and/or the actual value of the at least second parameter, respectively.

Correspondingly, the system which implements the above described "grid-method" according to the invention for determining at least one parameter relating to a tire-to-road contact and/or a relation between a wheel and a vehicle motion, comprises
  a plurality of sensors for sensing a plurality of parameters related to the vehicle motion,
  a control unit with at least one memory, in which memory a relationship defined by at least two parameters relating to the tire and/or vehicle motion is stored,
  at least one filter operative to determine said at least one parameter, whereby the filter comprises
  means operative to define a finite set of values for at least two of said parameters, respectively,
  means operative to identify values for the at least two parameters, respectively, which correspond to said finite sets based on said relationship,
  means operative to determine the actual value of an at least first parameter and/or the actual value of an at least second parameter, and
  means operative to select the at least one parameter which corresponds to the values for the at least first parameter and/or for the at least second parameter based on said relationship which are closest to the determined actual value of the at least first parameter and/or the actual value of the at least second parameter, respectively.

In particular, the above mentioned alternative "grid-method" as implemented in the above system for determining at least one parameter relating to a tire-to-road contact and/or a relation between a wheel and a vehicle motion comprising a control unit which receives first signals from sensors representing a plurality of parameters related to the vehicle motion, receives second signals from a memory representing a relationship defined by at least two parameters relating to the tire and/or the vehicle motion, transmits third signals to at least one filter representing the definition of a finite set of values of at least two of said parameters, respectively, transmits fourth signals to the at least one filter representing the determination of an actual value of an at least first parameter and/or of an at least second parameter, receives fifth signals from said at least one filter representing the selection of the at least one parameter which corresponds to the values for the at least first parameter and/or of the at least second parameter based on said relationship, which at least one parameter is selected by the at least one filter as being the closest to the determined actual value of the at least first parameter and/or of the at least second parameter, respectively.

The "grid-method" enables a quick friction estimation, in that optimal values are chosen from a set of at least two parameters relating to the tire and/or vehicle motion when comparing the cost function during a certain amount of time. Accordingly, the method further comprises the steps of limiting the estimation filtering to a defined time frame.

In a preferred embodiment of the "grid-method" according to the invention, the at least first parameter is selected to be the coefficient of friction, whereas the at least second parameter is selected to be the tire stiffness.

In a preferred embodiment both the "data bin-method" and the "grid-method" are further developed in that they further may comprise the steps of continuously applying corrective filtering procedures to the sensed parameters, and updating the continuously corrected values in the defined relationship. In particular, means are provided in which the value of the rolling radius of the tire is continuously corrected and updated.

Furthermore, the above described different methods and their single steps will be performed in such a way that the different parameters will be determined for both the longitudinal direction and the lateral direction of the tire, and preferably individually for each tire of the vehicle, irrespective of the amount of wheels to be used by the vehicle to be controlled.

Contrary to the estimation methods known from the prior art, which mostly are merely time depending, the methods and the systems according to the invention as described above consider also the spatial issues with regard to the parameter measurements, i.e. "spatial" in the sense of the signal/parameter space.

In preferred embodiments of the invention, the at least one parameter relating to the tire-to-road contact and/or the relation between a wheel and a vehicle motion to be determined is the coefficient of friction.

According to the invention, the predefined tire model both used for the methods and the systems may be the physically based, so-called "Brush-tire model", which describes the effects of the frictional limitations in the contact patch for increasing slip. The "Brush-tire model" is well-known to those skilled in the art and explained in detail in the publication entitled "Tire Models for Use in Braking Applications" by Jacob Svendenius (Technical Report Licentiate thesis ISRN LUTFD2/TFRT-3232-SE, Lund Institute of Technology, November 2003), which is hereby incorporated by reference herein.

This tire model, which in fact only uses three unknown parameters (lateral tire stiffness, longitudinal tire stiffness and tire/road friction coefficient) is used and adapted to specify the curvature of the force-slip relation on the one hand by using the discretization into predefined data bins according to the "data bin-method", or to specify the curvature of the tire stiffness-friction relation on the other hand by using predefined grid segments according to the "grid-method", respectively.

In the "data bin-method", the states in the data bins which each represent the normalized tire force and the tire slip in the predefined tire model are used in the so-called cost function from which the optimal parameters for the tire stiffness and the coefficient of friction can be then calculated.

The use of memory segments in the plane as defined by the tire force and the tire slip, either in the form of data bins or of grid sections, provides a memory-efficient way to remember and filter old data in order to increase the persistence of excitation and to decrease the sensitivity to disturbances.

BRIEF DESCRIPTION OF THE DRAWINGS

The methods on the one hand and the systems on the other hand according to the invention will become more apparent form the detailed description by way of example with reference to the attached drawings of the different embodiments. In the Figs.

DETAILED DESCRIPTION OF THE INVENTION

Figure 1:
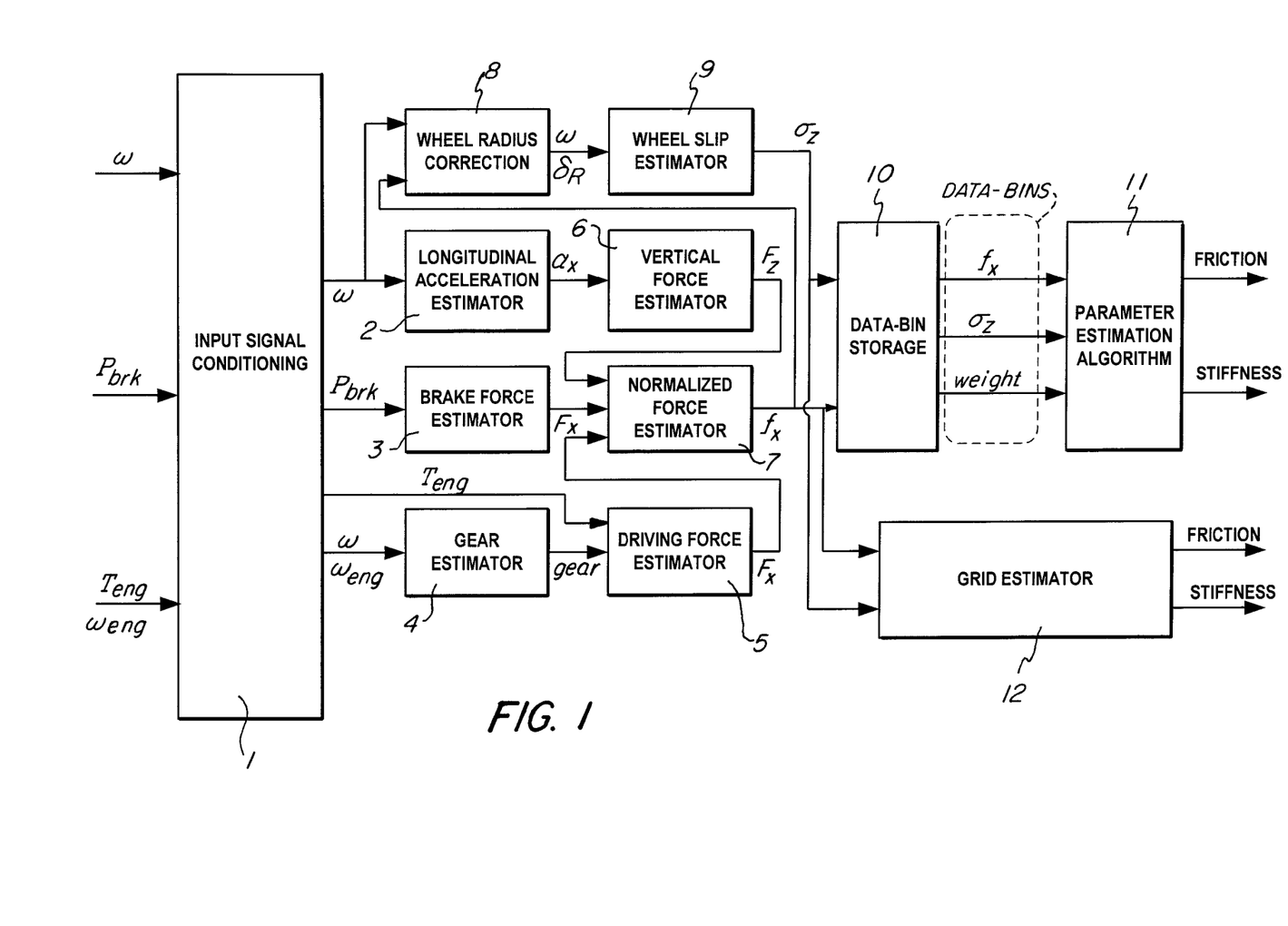
FIG. 1 is a flow chart showing the single steps for deriving the necessary signals for the methods and systems according to the invention.

FIG. 1 illustrates the general principle of a system and a method for determining or estimating the coefficient of friction according to the invention, whereby it has to be noted that steps 1 to 9 are per se known from the prior art and steps 10 to 11 and step 12, respectively, denote the additional effects according to the actual invention.

The means to enable the single steps 1 to 11 or 1 to 12 as described can be implemented into a control unit or circuit arrangement, which can be used in vehicle assistance system, such as e.g. ABS or ESP.

In step 1, the input signals will be prepared for further processing. The input signals relate to the parameters which can be detected by suitable sensors arranged within the vehicle. Such vehicle-dependent parameters include the actual rotational speed of the wheel or tire ω, whereby these rotational speeds can be determined for each individual wheels or tires of the vehicle, the rotational speed $\omega_{eng}$ which is provided by the engine to the wheels and the torque from the engine, $T_{eng}$, as well as the actuating braking pressure $p_{brk}$.

In a further step 2, from the rotational velocities ω of the single wheels, the longitudinal acceleration $a_x$ can be determined. At the same time in step 3, the according means of the control unit calculate the existing brake force per wheel from the pressure $p_{brk}$ applied by the brake actuator.

Step 4 denotes the estimation of the gear as currently selected by the control unit in case of an automatic transmission or the detection of the gear as presently selected by the driver on basis of the signals ω and $\omega_{eng}$.

Furthermore, in step 5 means of the control unit enable the estimation of the driving force $F_x$ in longitudinal direction, from the actual values of the engine torques $T_{eng}$ and the existing gear. In parallel, in step 6 the vertical force $F_z$ is determined from the longitudinal acceleration $a_x$.

In step 7, the normalized tire force $f_x$ can be determined from the vertical force $F_z$ and the driving force $F_x$.

Continuously considering the actual values of the rotational speed ω and the normalized tire force $f_x$ the actual radius of the wheel is corrected in step 8 by the deviations δR, in order to use this correctively filtered information for determining the actual tire slip $\sigma_x$ in step 9.

The parameters normalized tire force $f_x$ and actual tire slip $\sigma_x$ will be provided to the estimation filtering procedures, in which steps 10 to 11 denote the "data bin-method" or "data bin-system" and step 12 denotes the "grid-method" or "grid-system".

Both methods can be used as alternatives to determine the actual values for the coefficient of friction and the tire stiffness. However, according to the invention it is also possible to use both methods in parallel, as indicated in FIG. 1, in order to further limit the error rate for the estimation of the coefficient of friction or the tire stiffness. Alternatively, the grid estimator can be also used as the optimization procedures following the "data bin-method".

In step 10, a filtering processing is performed, in which the values for the actual normalized tire force $f_x$ and actual tire slip $\sigma_x$ are stored in data bins. This method step will be explained in more detail below. Afterwards in step 11, the weighted contents of the data bins are used for the estimation of the desired parameters.

Equivalently, in step 12, a different filtering processing is performed, which will be explained in more detail below also.

Figure 2:
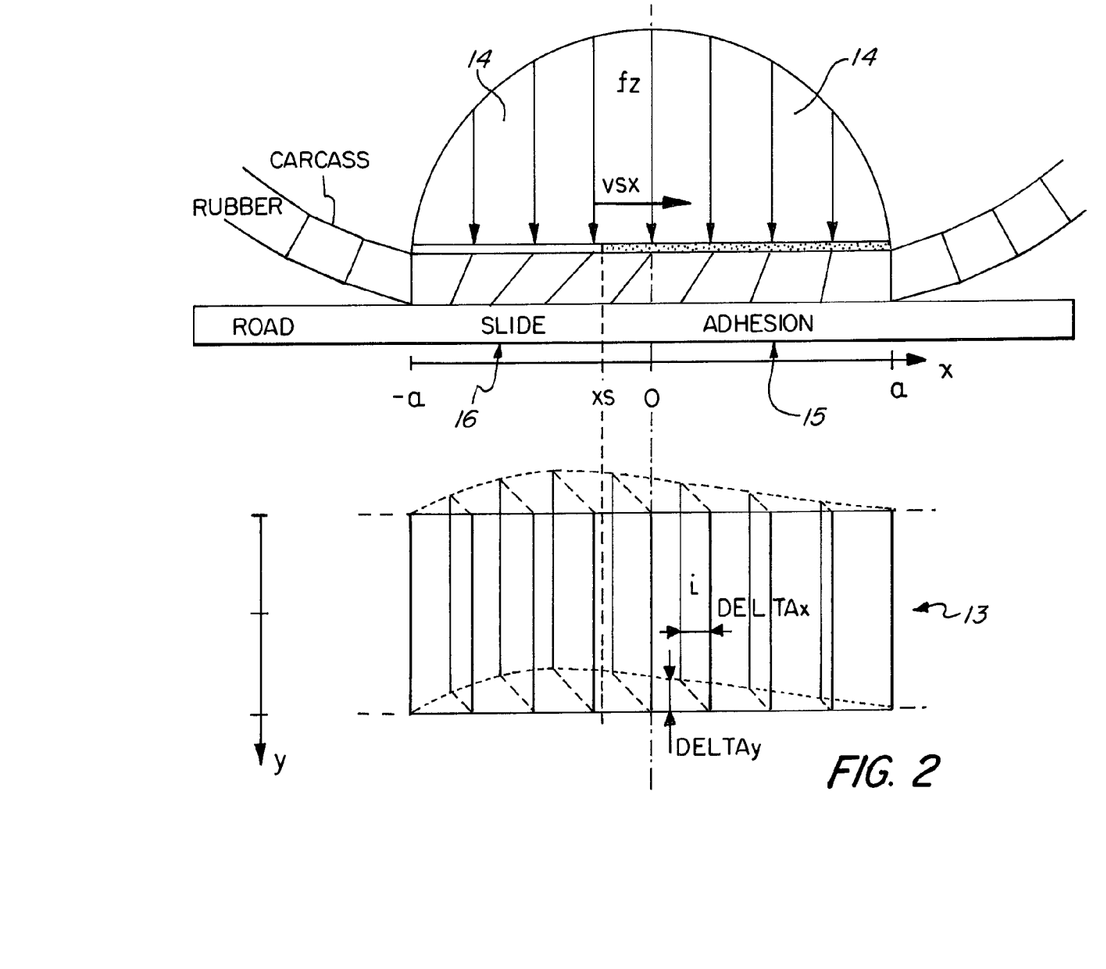
FIG. 2 is exemplarily showing the deformation of the tire on a road according to the "Brush tire model"

FIG. 2 schematically illustrates one predefined tire model to be used in the methods and the systems according to the invention. In the present case, the tire model shall be the so called "Brush tire model". However, any other tire model can be used for the purpose of the invention.

The "Brush tire model" is obtained by dividing the rubber volume in the contact region 13 of the road into small brush elements 14, regarded as elastic rectangular blades, or bristles, see FIG. 2. The lower part in FIG. 2 illustrates a bottom view of the carcass in the contact region 13 of the tire which is moving with the velocity $v_{sx}=v_x-R_e\omega$ relative to the road, whereas the contact zone 13 moves with the vehicle velocity $v_x$.

Each bristle 14 is assumed to deform independently in the longitudinal and lateral directions. Most essential in the model is the separation of the contact patch 13 into one adhesive area 15 and one sliding area 16, which are separated by the break-away point $x_s$. In the adhesive region 15 the bristles 14 adhere to the road surface and the deformation force is carried by static friction. In the sliding region 16 the bristles 14 slide on the road surface under the influence of sliding friction. The deformation of the bristles 14 is denoted by δ. Hence, in the sliding region 16 the resulting force is independent of the deformations of the bristles 14. Under the assumptions of a parabolic pressure distribution the mathematical formulation of the normalized, longitudinal tire force becomes $$\Psi(\sigma_x, C_{0x}, \mu) = \begin{cases} -C_{0x}\sigma_x + \frac{1}{3}\frac{C_{0x}^2 \sigma_x |\sigma_x|}{\mu} - \frac{1}{27}\frac{(C_{0x}\sigma_x)^3}{\mu} & \text{if } |\sigma_x| < \sigma_x^o \\ -\mu\,\text{sign}(\sigma_x) & \text{otherwise} \end{cases} \quad (1)$$

where $\sigma^o_x = 3\mu/C_{0x}$ is the tire limit slip, $C_{0x}$ is the normalized tire stiffness and μ is the friction coefficient. The slip is defined as $\sigma_x = (v_x - R_e\omega)/(R_e\omega)$, where $v_x$ is the longitudinal velocity of the vehicle, $R_e$ is the rolling radius of a single wheel or tire and ω is the rotational speed of the wheel. Equation (1) provides the relationship between the first parameter, namely the tire force Ψ, and the second parameter, namely the tire slip $\sigma_x$, which pair of parameters are used for the data bins as will be explained further down below.

Figure 3:
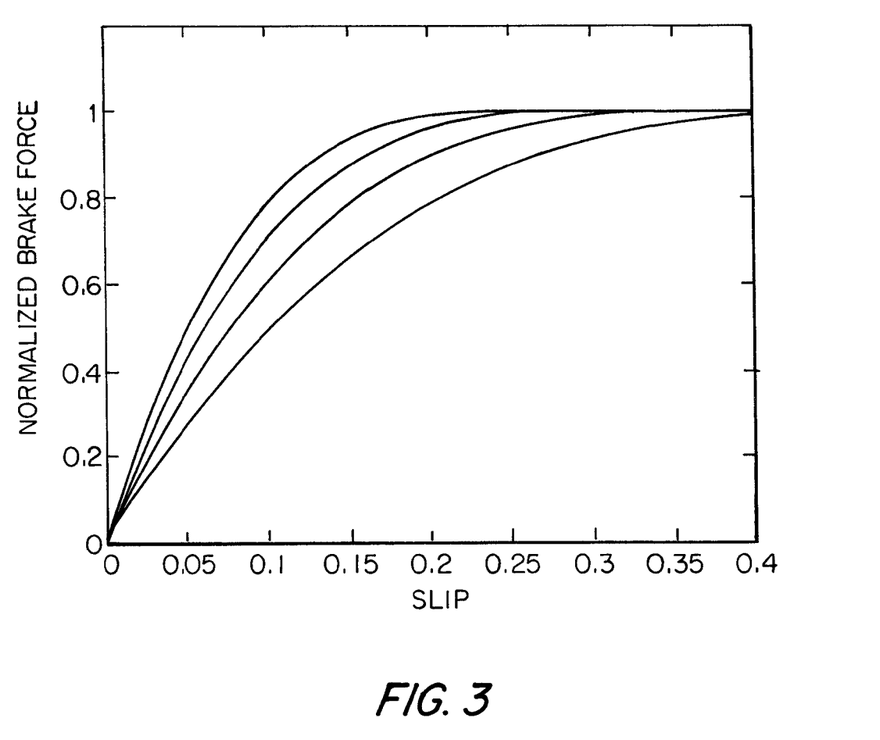
FIG. 3 is a plot of the force-slip relation according to the "Brush tire model" without the step of spatially dividing the thereby defined tire-slip plane in memory segments according to the invention.

The Brush tire model for varying parameters is exemplarily shown in FIG. 3, which illustrates the data plane as defined by said relationship between the tire force and the tire slip according to said model.

Using the "Brush tire model", from the relationship between the tire force and the tire slip using above-mentioned equation (1) the tire stiffness $C_{0x}$ at braking and the coefficient of friction μ can be estimated.

According to the invention, the data so available will be further processed so as to provide a better accuracy of the estimation routines applied.

Figure 4A:
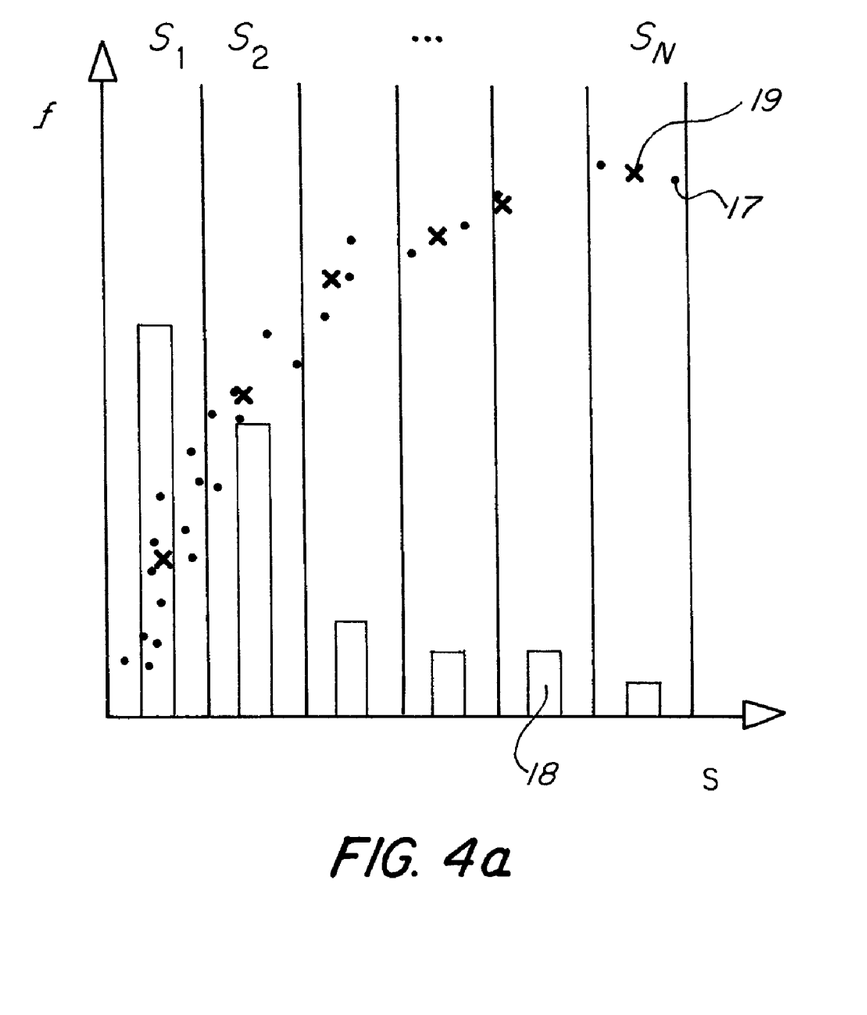
FIG. 4a is a plot of the force-slip relation illustrating selectively defined intervals for the data bins for the tire slip.
Figure 4B:
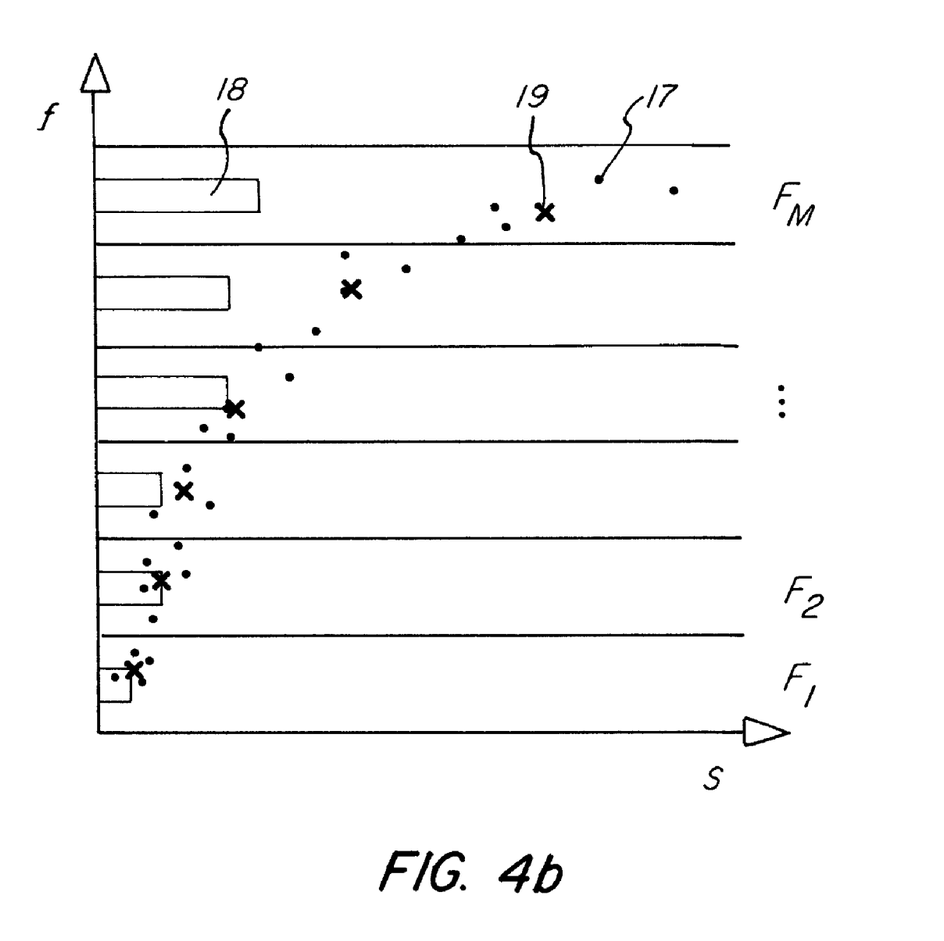
FIG. 4b is a plot of the force-slip relation illustrating selectively defined intervals for the data bins for the tire force.

FIG. 4a and FIG. 4b illustrate one example of applied estimation filtering procedures according to the invention: the concept of storing the data for the tire force and the tire slip in data bins which are defined in correspondence of specified intervals, as will be explained in the following.

The parameter space defined by the relation between the tire force and the tire slip are divided into intervals, namely interval $S_i$ for the tire slip and intervals $F_i$ for the tire force. For each axis, the intervals can be evenly or unevenly distributed. One suitable distribution in the filtering would, for example, may be 15 intervals for the slip axis and up to 100 intervals for the force axis.

Exemplarily, FIG. 4a illustrates the division of the data plane s–f as defined by the relation between the tire force f and the tire slip s into intervals $S_i(i=1-N)$ for the tire slip, whereas FIG. 4b illustrates the division of said data plane into intervals $F_i(i=1-M)$ for the tire force. The dots 17 represent samples of the values which have been stored in the respective data bins in these intervals $S_i$ and $F_i$, whereas the staples 18 indicate the present number of value samples in each data bin in the intervals $S_i$ and $F_i$, respectively. The crosses 19 denote the resulting estimates for the data bins per interval.

Data filtering based on the step of using storage data bins, respectively, relates to the estimation of parameters of a scalar nonlinear monotone function:

$$y = g(x, \theta) \quad (2)$$

A point wise approximation of g which is described by pairs $(s'_i, f'_i)$ and $(s''_i, f''_i)$ is constructed and then the estimation of the tire stiffness $C_x$ and the coefficient of friction μ is enabled in that the cost as defined by:

$$\sum_i \omega_i'(f_i' - g(s_i', \hat{C}_x, \hat{\mu}))^2 + \sum_j \omega_j''(f_j'' - g(s_j'', \hat{C}_x, \hat{\mu}))^2 \quad (3)$$

is minimized by the use of non-linear optimization methods, as this will be described further below.

Generally speaking, the memory segments formed as data bins are used to estimate an approximation of a monotone function $g: x \to y$ at discrete points along the ranges of x or y, from imperfect samples x and y. The ranges of x and y are partitioned into disjoint intervals $X_i$ and $Y_i$ defined by points $x_i$ and $y_i$ which resemble the values for the slip and the force respectively, such that:

$$X_i = \{x | x_{i-1} < x \leq x_i\}$$

$$Y_i = \{y | y_{i-1} < y \leq y_i\} \quad (4a, 4b)$$

The data bin $X_i$ can basically be defined as a tuple $X_i = (X_i, x'_i, y'_i)$ where $x'_i$ and $y'_i$ give the local estimation of g for $x \in X_i$, respectively. Likewise, data bin $Y_i$ is defined as a tuple $Y_i = (Y_i, x''_i, y''_i)$ where $x''_i$ and $y''_i$ gives the local estimation of g for $y \in Y_i$.

Since any x and y must be uniquely mapped to corresponding data bins $X_i$ and $Y_i$, a monotone behaviour of g is obviously required.

The crosses 19 in FIGS. 4a and b, respectively, indicate the resulting estimates for each of the corresponding data bins. The data bin estimation can be regarded as event based rather than time based, since the estimate in any particular data bin is updated only when measurement values fall within the corresponding range.

The basic estimation in the filtering according to the invention is done by computing $(x'_i, y'_i)$ and $(x''_i, y''_i)$ as the recursive average of samples x and y. A limited memory for each data bin is introduced by adding a sample-count limit $N_i$ and a sample count $n_i \in [0, N_i]$ to the data bin tuples. Furthermore, a forgetting factor $\lambda_i = 1 - 1/n_i$ is introduced such that the estimates will only depend on the last $N_i$ samples. The recursive-average estimates can then be given by the relation:

$$x_i'(k) = \begin{cases} \lambda_i(k) x_i'(k-1) + (1-\lambda_i(k))\hat{x}(k), & \text{when } \hat{x}(k) \in X_i \\ x_i'(k-1), & \text{otherwise} \end{cases} \quad (5)$$

The averaging routines in the computation for the data bins are generally used in order to reduce the effects of measurement noise. In theory, since the estimates $(x'_i, y'_i)$, $(x''_i, y''_i)$ are formed by sums of the samples, they will approach a normal distribution as stated by the Central Limit Theorem CLT. In practice, it is unlikely that the CLT convergence will have any significant visible effects, since the sample-count limit $N_i$ will truncate the averaging sum.

The filtering estimates procedures according to the invention further enable a confidence assessment for the respective values in the data bins, which provides measures of the content quality. In particular, a recursive variance estimate of the samples can be introduced. Likewise, a freshness measure can be introduced to keep track of these data bins which contain the most recent information. Measures like this can be used to form weights $w_i$ to be used in the cost function (3) for further parameter estimation.

In addition, the variance measure of the estimation filtering procedures can be used to eliminate outliers, for example by allowing only new samples that lie within a variance-dependent range from the current estimate. Care must be taken so that such mechanisms do not interfere with the change detection as described below.

In addition, LP-filtering on the measurements can be performed in order to reduce the undesired effect of large noise.

Furthermore, it is assumed for further processing that the estimated function g is time invariant. If g depends on time varying parameters $\theta(t)$ then it is in general difficult to maintain the contents of the data bin in a consistent state. If $\theta(t)$ are piecewise time invariant, and only changes at discrete events in time, then the changes can be detected by using information on bin variance or from the parameter optimization. A sudden change of $\theta(t)$ at time $t_1$ such that $\theta(t) = \theta_0$ for $t < t_1$ and $\theta(t) = \theta_1$ for $t \geq t_1$ will lead to a corresponding increase in the estimated variance v in the data bins at the present operating point. This may be used to trigger operations which can be performed at change detection. Suddenly occurring inconsistencies in the data bin contents may also lead to a corresponding increase of the error function (3) in the parameter optimization, which may also be used as a trigger. Accordingly, when a change is detected in the data bins, the latter will be cleared from the old information contained therein and reset.

Traditional filtering and estimation methods known from the prior art in fact operate on data within a limited time window only. In it, the estimates at each time instant are based on a weighted sum of the previous estimate and information that can be extracted from the present measurement values. Previous input data will be only remembered implicitly in the estimated parameters and will be forgotten as time passes. It is therefore difficult to control which operating point the estimates are based on. These traditional methods also tend to be less robust and difficult to apply in practice for nonlinear models. Accordingly, for such models non-linear optimization methods may be better suited.

To enable this, according to the invention in one embodiment, the data bin-concept is introduced to offer input data of a suitable format for the desired non-linear optimization algorithms. It is a method to store, in a compact form, information from different operating points with persistency over time. By this, it is easier to ensure sufficient excitation and the ability of observance for the desired parameter estimation. For example, it may prevent loss of the ability of observance when driving at constant slip for a long time. It also offers the possibility of convenient post-processing and confidence classification of data before delivered to the optimization algorithms. As a result, change detection and handling of outliers can be done intuitively. Additionally, the method reduces effects of measurement noise, which is particularly important for the slip.

In a further step of the method according to the invention, an "estimator" employing optimization algorithms is used, in order to continuously adapt the plurality of the estimated parameters of the "Brush tire model" to the actual tire force and the actual tire slip.

In principle, the estimator is an optimization algorithm that from a set of data points, $\Omega_i = \{\Omega_i = [x_i, y_i]\}$, calculates the parameters, $\theta$, included in a function, $\Psi$, such that the cost function $$J(\Omega, \theta) = \sum_{i=1}^{N} \frac{\omega_i e^2(\Omega_i, \theta)}{2} \quad (6)$$

is minimized. The number of coupled observations in $\Omega$ is N. The weighting of each data point for the estimation is specified in the vector $w=\{w_i \in [0, 1]\}$. The error is derived as $$e_i = e(\Omega_i, \theta) = \hat{y}_i - \Psi(\hat{x}_i, \theta) \qquad (7)$$

with $\Psi$ as the chosen parameter model.

Three different optimization algorithms are found suitable to be used in connection with the invention, which will be described in the following.

The Least-Squares method constitutes a robust method, which is limited to linear parameter relations and therefore used to detect the slope curvature at low slips where the third order term, from equation (1) can be neglected.

The Least-Squares method is a linear-regression analysis method based on the model formulation $$y_i = \phi^T \theta + e_i \qquad (8)$$

where the output $y_i$ and the input $x_i$ are measured, calculated, or derived in other ways.

The elements in the regressor vector $\phi$ correspond to the parameters for the estimation in the vector $\theta$. The method generally is an offline-method, which means that a batch of data is necessary for the calculation of the parameters, which are supposed not to vary within the respective period. The result of the method is the estimate that minimizes the sum of the square of the errors according to equation (6) and can be calculated as $$\hat{\theta} = (\Phi^T W \Phi)^{-1} \Phi^T W y \qquad (9)$$

The regressor matrix $\phi$ contains the corresponding regressor vectors as $[\phi_1 \phi_2 \ldots \phi N]^T$ and the weight matrix is formed as $W = |w$.

Using the Least-Squares method together with the "Brush tire model", the demand on linearity in parameters will restrict the working range. For low slip, the tire stiffness can be calculated by choosing $\theta = C_{0x}$, with $\phi_i = x_i$. For the estimation of the friction, when a curvature of the force-slip relation is detected, parameters are, $\theta = [C_{0x} \; \theta_2]^T$ and the regressors $\phi_i = [-x_i \; x_i | x_i|]^T$.

The friction coefficient $\mu$ can be derived from the result as $\mu = C_{0x}/(3\theta_2)$. Neglecting the third order factor of the slip from the brush model will give an error at higher slip and the method will be not reliable if the data set includes slip values above the slip limit $\sigma^o_x$.

The input and output signals x, y are given by the values $\sigma_x$ and $f_x$ derived and stored in the respective data bins.

Another optimization to be used in connection with the invention is the Gauss-Newton optimization method, which is more computer demanding. The Gauss-Newton is able to catch non-linear behaviour and is used for a more accurate and reliable estimation when data points which are closer to the friction limit are available.

In the area of convex optimization the Gauss-Newton method is used as a substitute to the Least-Squares method when non-linear problems have to be solved. The general problem is to minimize the sum of errors according to equation (6). A non-linear problem can in most cases not be solved directly and the solution has to be found by iteration. The amount of iterations depends, e.g. on the properties of the function, the initial values of the parameters and the required accuracy on the estimates. A common way is to update the parameters in the direction of the steepest descent of the cost function, $J(\Omega, \theta)$, hence $\theta_{k+1} = \theta_k - \Delta J(\Omega, \theta_k)$.

In Newton's method the quadratic term, corresponding to the change of the gradient, is considered. The update becomes $\theta_{k+1} = \theta_k - H^{-1}(\theta_k)\Delta J(\Omega, \theta_k)$, where H is the Hessian function, a quadratic matrix, whose entries are the second order derivatives of J with respect to $\theta$, defined as $$H(\Omega, \theta) = \frac{\partial^2 J}{\partial \theta_i \partial \theta_j}(\Omega, \theta) \qquad (10)$$

In most cases the calculation of the Hessian H is not convenient and in the Gauss-Newton method it is approximated as $H(\Omega,\theta) \approx 2J(\Omega,\theta) \; WJ^T(\Omega,\theta)$.

The Jacobian matrix is defined as $J(\Omega, \theta) = (\delta_{ei}/\delta\theta_j)$, where the $i=1 \ldots N$ denotes the row number and j the column number. The update scheme becomes $$\theta_{k+1} = \theta_k - (J)(\Omega,\theta_k)^T W J(\Omega,\theta_k))^{-1} J(\Omega,\theta_k) We)) \qquad (11)$$

In order for the Gauss-Newton method to converge it is required that the initial point is sufficiently close to the minimum point and that the approximation of H valid.

Adapting the method to the "Brush tire model" $\theta$ will denote the parameters $[C_{0x}, \mu]$. The error vector e is calculated from equation (7) with $\Psi$ as the "Brush tire model" from equation (1). The model output y and the input x are replaced by the contents in the data bins for the tire force $f_x$ and the tire slip $\sigma_x$, respectively. The Jacobian matrix accordingly becomes $$J(\Omega, \theta) = \begin{bmatrix} \frac{\partial e_1}{\partial C_{0x}} & \frac{\partial e_2}{\partial C_{0x}} & \ldots & \frac{\partial e_N}{\partial C_{0x}} \\ \frac{\partial e_1}{\partial \mu} & \frac{\partial e_2}{\partial \mu} & \ldots & \frac{\partial e_N}{\partial \mu} \end{bmatrix}^T \qquad (12)$$

where the respective partial derivative is then given by $$\frac{\partial e}{\partial C_{0x}} = \begin{cases} -\sigma_x + \frac{2}{3}\frac{C_{0x}\sigma_x^2}{\mu}\text{sign}(\sigma_x) - \frac{1}{9}\frac{C_{0x}^2\sigma_x^3}{(\mu)^2} & \text{if } |\sigma_x| < \sigma_x^o \\ 0 & \text{otherwise} \end{cases} \qquad (13,14)$$

$$\frac{\partial e}{\partial \mu} = \begin{cases} -\frac{1}{3}\frac{(C_{0x}\sigma_x)^2}{\mu^2}\text{sign}(\sigma_x) + \frac{2}{27}\frac{(C_{0x}\sigma_x)^3}{\mu^3} & \text{if } |\sigma_x| < \sigma_x^o \\ -\text{sign}(\sigma_x) & \text{otherwise} \end{cases}$$

with the tire limit slip $\sigma^o_x = 3\mu/C_{0x}$.

The method works on a batch of data just as the method of Least-Squares. The benefit with the Gauss-Newton is that it catches the non-linearity in the "Brush tire model", which makes the result more accurate at slip values close to and above the limit slip.

As an alternative for both the Least-Squares method and the Gauss-Newton method, the so-called "grid-method" can be applied as optimization routines.

According to the invention, however, this "grid-method" can be also used as an alternative to the data bin-based filtering in combination with an optimization routine.

Moreover, in a preferred embodiment according to the invention, the estimator of the "grid-method" may be also used together with the data bin-filtering as a combined optimization approach.

Basically the "grid-method" provides an estimator which uses a predefined grid of the parameter space.

In other words, the memory segments in the parameter plane as defined by the relationship between the tire stiffness and the coefficient of friction are formed as memory sections or grids. Determining the actual value of the tire stiffness and the actual value of the friction coefficient includes the step of storing the error signals between the measured tire force and tire slip and the estimated tire fore and tire slip in corresponding grid-like memory sections using suitable filtering algorithms. A predefined set of possible values for the tire stiffness and the coefficient of friction is used to form the estimated tire slip and tire force. The predefined set forms a discrete grid, lattice or pattern which partitions the data plane as defined by the relationship between the tire stiffness and the coefficient of friction. The values for the estimated tire stiffness and the friction coefficient are then chosen as the predefined values for the tire stiffness and the coefficient of friction which corresponds to the smallest error signal.

In fact, the "grid-method" is able to provide the most stable performance, in particular as an alternative estimation technique.

The reason for using such an estimator is the problem that arises in estimating parameters in a nonlinear function where the standard objective, i.e. minimizing a quadratic criteria, is not locally in time convex. For the present application, i.e. the problem of determining the tire to road stiffness $C_{0x}$ and the coefficient of friction $\mu$, this weak convexity property can be illustrated by the following scenario: A typical driving situation is cruising at constant speed or with very small changes in vehicle velocity. This will result in a close to constant slip $\sigma_x$ and a close to constant normalized force $f_x$. A conventional estimator based on a quadratic criteria would easily find a parameter set. However, the optimum does not necessary coincide with the parameter set that minimizes the error when the slip is changing. In fact, for one point in the force slip plane it is possible to find a continuum of parameters that passes through that point, which is exemplarily illustrated in FIG. 5 with reference numeral 20.

Figure 5:
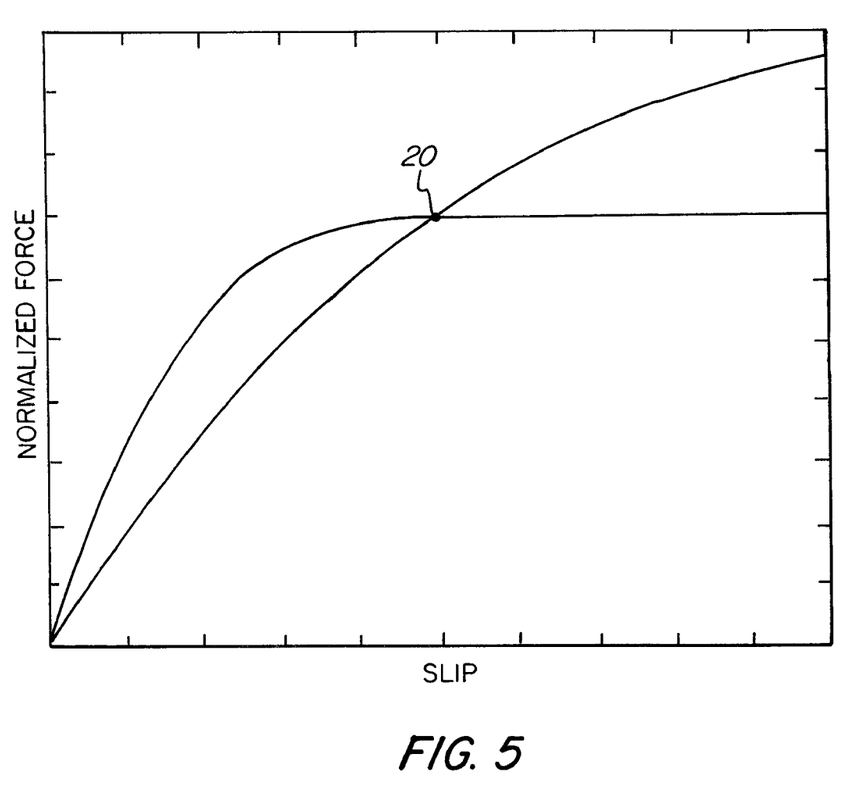
FIG. 5 is a plot of the force-slip relation illustrating selectively defined memory sections according to the "grid method"

In order to overcome this problem in a conventional estimator one has to make the estimator slower, such that error is remembered when new slips enter the estimator. This, however, in turn would make the estimator too slow, as the tire to road friction can change instantaneously.

The problem statement underlying the "grid-method" is to find a stiffness $C_{0x}$ and a friction coefficient $\mu$ in the longitudinal Brush tire model, $f_x = \Psi(\sigma_x, C_{0x}, \mu)$ as given in equation (1) that in some sense matches the measured slip $\sigma_x$ and normalized longitudinal force $f_x$. By minimizing the criteria, $$\min_{C_{0x},\mu} \|\Psi(\hat{\sigma}_x; C_{0x}, \mu) - \hat{f}_x\|$$

iteratively, one will end up with the problems as described above. Hence, a formulation where multiple operating conditions (i.e. different slips and forces) are used is necessary to obtain a convex problem.

The grid estimator can be realized by introducing a multiple operating conditions dependence in the estimator, without introducing a slow convergence of the estimated parameters, in that multiple memories or memory sections in the estimated parameters are introduced. The memory sections may be distributed on a discrete grid or lattice in the parameter space, $$\mathcal{P} = \{(C_{0x}^i, \mu^j)\}_{i,j}$$

and formed by a filtered error between the model output and the measurement of the normalized force, $$\mathcal{G}(p)\{|\Psi(\sigma_x; P_{ij}) - \hat{f}_x|\}_{i,j} \quad (15)$$

where p is the differentiation operator. The smallest component of this equation represents the parameter set that is closest to the measurement for that specific measure formed by the filter G. The estimate will hence be a set of parameters belonging to the lattice P. As mentioned above, one possibility is to use this approach in combination with the data bin filtering.

The grid estimator is tuned by the filter G. This filter G forms the measure and hence defines the term closeness to the measurement $(\sigma_x, f_x)$.

To achieve the most convex surface in the parameter space $(C_x, \mu)$, the filter needs to be an integral. However, an integral would render the above-mentioned expression (15) to be remembering all past time, and a change in the conditions of the measurement, i.e. a change of the true friction and stiffness, would take some while to reveal itself.

Accordingly, a forgetting factor will introduce a time horizon of the estimator and make the objective function finite. One way of implement the integral with a forgetting factor is a first order time invariant linear filter, $$\mathcal{G}(p) = \frac{1}{p + \tau}$$

where τ is the forgetting factor. The tuning parameter τ will then determine the noise sensitivity in the measurements and the ability to detect changes in the measurement. A small τ will decrease the noise sensitivity and in addition decrease the sensitivity to changes of the real parameters.

The convergence of the parameters is determined by the tuning parameter τ, but not as in a conventional estimator. Given an initial condition of the states in the filter G, which is equal over the lattice, the convergence rate is independent of the tuning parameter (given that it is strictly positive, no noise is present in the data and that the data is generated from the model). An initial condition that is unequally distributed over the lattice will introduce a tuning parameter dependence of the convergence. Hence, a periodic reset of the memory will minimize this dependence, and enable a tuning consideration involving only noise properties of the involved data.

According to the invention, the system and the methods can be further enhanced so as to enable more accurate results.

Therefore, in order to achieve good optimization results it is important that the rolling radius, $R_e$, of each wheel is accurately estimated.

The rolling radius $R_e$ affects the slip calculation and a deviation from its nominal value will cause a horizontal shift in the force-slip relationship as defined by the tire model, such that it does not cross the origin. There are many factors that affect $R_e$ and the deviation, $\delta R$, has to be continuously updated by comparing the wheel speeds of each tire with a reference speed when no forces are transmitted by the tire. If the periods of free rolling are not sufficient the estimation can be complemented by adding one extra parameter, denoting the horizontal shift, in the optimization.

Here, the undriven wheels are used as reference for the vehicle speed. Therefore, only the deviations between the radii of the different tires are necessary estimates for the slip computation. The deviations, $\delta R$, are derived by comparing each wheel rotational speed $\omega_i$ with the rotational speed of the front left wheel $\omega_l$ and computing correction factors for the wheels as $$\delta R_i = \delta R_i + K(R_{e1}\omega_1 - (R_{ei})\omega_i) \quad (16)$$

where $R_{ei} = R_{nom}(1 + \delta R_i + \Delta R_i(\cdot))$ is the rolling radius for the i-th wheel.

Known dependence on other factors, such as the vertical load on the tire can be included in $\Delta R(\cdot)$. Correction is only performed when no forces are transmitted by the tire.

The high stiffness of vehicle tires makes the traction force extremely sensitive to the slip. Hence, a correct slip is essential to be able to estimate the tire to road friction.

In a situation of both acceleration or braking, the vertical load of the tire will change. This will, among other things, impact the rolling radius of the tire.

The slip impact of the load transfer is a crucial parameter to be considered for the wheel radii correction routines.

Generally, the radii of the tires are equal for all wheels when the vehicle is not exposed to any load transfer.

As known, the slip is defined by $$\sigma_x = \frac{v_x - \omega_f r_f}{\omega_f r_f}$$

where the vehicle velocity $v_x$ is computed by the rear axis wheel speed, i.e.

$$v_x = \omega_r r_r.$$

Assuming that the radius for both front and rear wheels are $r_0$ for the static case, and the radius for dynamic load transfer is given by, $r_f = r_0 + \Delta r_f$ and $r_r = r_0 + \Delta r_r$. This implies that the slip expression may be written as, $$\sigma_x = \frac{r_0 + \Delta r_r}{r_0 + \Delta r_f} \frac{\omega_r}{\omega_f} - 1 = \kappa \frac{\omega_r}{\omega_f} - 1$$

By adding and subtracting $k\omega_r/w_f$ to the expression above, one results in $$\sigma_x = \kappa(\sigma_{x0}+1)+\kappa-1$$

where $\sigma_{x_0}$ represents the slip with no load transfer, i.e. with all wheels having radius $r_0$. Assuming that the load transfers impact to the radius is a symmetric function implies that the $\Delta r = \Delta r_f = -\Delta r_r$. Hence, the relative slip error due to load transfer is given by, $$\eta_\sigma = \frac{\sigma_x - \sigma_{x_0}}{\sigma_{x_0}} \tag{17}$$

$$= (\kappa - 1)\frac{\sigma_{x_0} + 1}{\sigma_{x_0}}$$

$$= -2\frac{\Delta r}{r_0 + \Delta r}\frac{\sigma_{x_0} + 1}{\sigma_{x_0}}$$

In order to visualize the impact of load transfer to the slip from the above equation (17), there is a need to express the slip and the radius dependence of the load transfer as functions of, for example, the vehicle acceleration. The load transfer due to vehicle acceleration can be derived, using a force and a torque conservation equation, as $$\Delta N = \frac{m a_x h}{2L} \tag{18}$$

where m is the vehicle mass, h is the center of gravity over ground distance, L the wheelbase and $a_x$ is the vehicle acceleration.

The radius will most likely not have an affine dependence of the vertical load, especially not for high loads. However, it can be furthermore assumed that the dependence is affine for reasonably small load changes, e.g. from load transfer due to vehicle acceleration, then the radius deviation from the nominal one can be characterized by, $$\Delta r = k\Delta N = k\frac{m a_x h}{2L} \tag{19}$$

The parameter k indicates the vertical tire stiffness, which is different for different tires. Given that the dependence in the rolling radius is linear, these differences can be compensated in that a fixed standard tire vertical stiffness is introduced.

The slip on the one front wheel can be expressed in the acceleration using an inverse version of the Brush tire model and the load transfer expression according to equation (18) as, $$\sigma_{x_0} = -3\frac{\mu}{C_x}\left(1 - \left(1 - \frac{La_x}{(gl - a_x h)\mu}\right)^{1/3}\right) \tag{20}$$

where l is the distance from the center of gravity to the front axis of the vehicle.

Using equation (19) and (20) in (17) one can compute the relative slip error given to the road condition, i.e. a value for $\mu$ and a value for $C_x$, and the acceleration $a_x$ as provided by the driver.

By plotting the slip with and without the load transfer versus the normalized force (using the brush model), it becomes clear that the load transfer will distort the slip-force curve for high stiffness. Hence, for e.g. asphalt where the stiffness is high, one has to take this normal load dependence into account.

Figure 6:
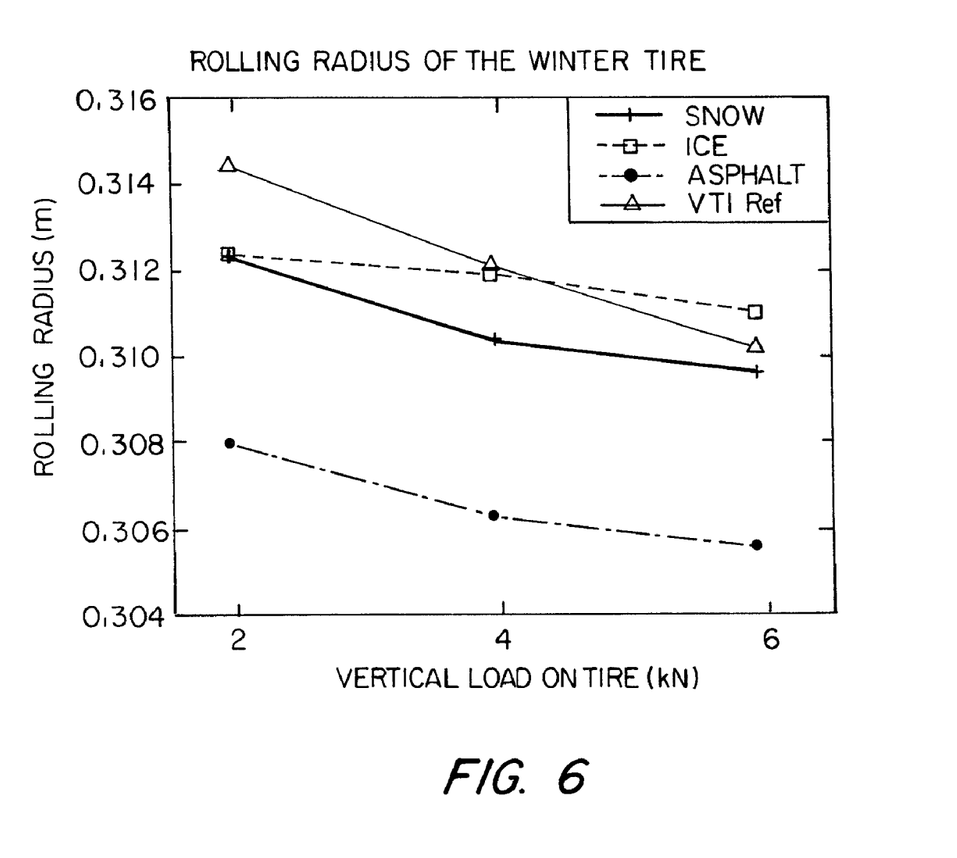
FIG. 6 is exemplarily showing the dependence of the free rolling radius of a tire from the vertical load acting on the tire.

FIG. 6 exemplarily illustrates the measured relation between the rolling radius of a winter tire and the vertical load on the tire depending on different ground conditions.

Furthermore, the rolling radius depends on the vertical load acting on the individual tire. In many cases this dependency is small and can be almost neglected.

Measurements and tests performed in connection with the invention have shown an approximate relation between the increment of the rolling radius and the vertical load as being $$\Delta R = k_l(F_{nomz} - F_z)/R_{nom} \tag{21}$$

which relation should be included into equation (16) as mentioned above. The relation and certainly the value of $k_l$ is tire specific and dependent on many other factors as well.

What is claimed is:

1. Method for determining at least one of a coefficient of friction and a tire stiffness of a tire, the method comprising the steps of:
    determining a plurality of vehicle parameters said vehicle parameters comprising vehicle motion parameters,
    determining said at least one of the coefficient of friction and the tire stiffness from a relationship defined by at least two of said vehicle parameters using estimation filtering procedures;
    characterized in that the estimation filtering procedures comprise the steps of:
    defining a set of data bins corresponding to intervals which are defined for values of at least two of said vehicle parameters, respectively,
    continuously determining an actual value of a first one of said at least two vehicle parameters and selecting the data bins corresponding to said actual value of the first one of said at least two vehicle parameters and updating and storing values of the first one of said at least two vehicle parameters and of a second one of said at least two vehicle parameters in said selected data bins, respectively, and/or continuously determining an actual value of the second one of said at least two parameters and selecting the data bins corresponding to said actual value of the second one of said at least two vehicle parameters and updating and storing values of the second one of said at least two vehicle parameters and of the first one of said at least two vehicle parameters in said selected data bins, respectively.

2. Method according to claim 1, wherein the data bins are defined for values of more than two vehicle parameters relating to at least one of the tire and the vehicle motion, respectively.

3. Method according to claim 1, wherein the steps of updating the values of the at least two vehicle parameters in the data bins include the step of:

averaging over the previously stored value of the first one of said at least two vehicle parameters or the previously stored value of the second one of said at least two vehicle parameters and the determined actual value of the first one of said at least two vehicle parameters or the determined actual value of the second one of said at least two vehicle parameters, respectively.

4. Method according to claim 1, further comprising the steps of:

assessing the importance of the values of the at least two vehicle parameters within each of the selected data bins, respectively, and/or assessing the confidence of the values of the at least two vehicle parameters within each of the selected data bins, respectively.

5. Method according to claim 1, further comprising the steps of:

detecting a defined change in at least one of the at least two vehicle parameters, and clearing and resetting the data bins.

6. Method according to claim 5, wherein the change is detected in at least one of the data bins.

7. Method according to claim 1, further comprising the step of:

continuously adapting said relationship to said updated values of the at least two vehicle parameters in the data bins, respectively.

8. Method according to claim 1, wherein the first one of said at least two vehicle parameters is a tire force and the second one of said at least two vehicle parameters is a tire slip.

9. Use of the method according to claim 1 in at least one assistance system of a vehicle.

10. Method for determining at least one of a coefficient of friction and a tire stiffness of a tire, wherein a control unit:

receives first signals from sensors representing a plurality of parameters related to a vehicle motion, receives second signals from a memory representing a relationship defined by at least two parameters relating to at least one of the tire and the vehicle motion, transmits third signals to at least one filter representing a definition of a set of data bins corresponding to intervals which are defined for values of said at least two parameters, transmits fourth signals to the at least one filter representing a determination of an actual value of at least one of a first one and a second one of said at least two parameters, receives fifth signals from said at least one filter representing updated and stored values of the first one of said at least two parameters and of the second one of said at least two parameters in data bins, respectively, which data bins have been selected by the at least one filter on basis of the fourth signals.

11. Method according to claim 10, wherein the control unit:

transmits sixth signals representing the at least one of the coefficient of friction and the tire stiffness to be determined to an assistance system of the vehicle for further processing.

* * * * *